United States Patent Office 3,483,923
Patented Dec. 16, 1969

3,483,923
OIL RECOVERY USING COMBINATION OIL-WETTING AND ACIDIZING TREATMENTS
Henry C. H. Darley, Houston, Tex., assignor to Shell Oil Company, New York, N.Y., a corporation of Delaware
No Drawing. Continuation-in-part of application Ser. No. 603,722, Dec. 22, 1966. This application Mar. 29, 1968, Ser. No. 717,402
Int. Cl. E21b 43/27, 43/24
U.S. Cl. 166—271
14 Claims

ABSTRACT OF THE DISCLOSURE

A process for improving and stabilizing the effective permeability of a subterranean earth formation for subsequent fluid drive oil recovery by subjecting the formation to a combination of oil-wetting and acidizing treatments.

CROSS-REFERENCE TO RELATED APPLICATION

This application is a continuation-in-part of copending patent application Ser. No. 603,722, filed Dec. 22, 1966 and which matured as U.S. Patent 3,422,890 on Jan. 21, 1969.

The present invention relates to a process for improving the preferential permeability to oil-immiscible fluids such as aqueous solutions, e.g., water and/or steam, or subterranean earth formations. More particularly the invention pertains to an improved process for recovering hydrocarbons from underground fomations by subjecting such formations to a new and novel combination of acidizing and oil-wetting treatment so as to increase the stability and relative permeability of the formation to immiscible fluid drives such as water and/or steam so as to improve and increase hydrocarbon recovery.

BACKGROUND OF THE INVENTION

Although it is well known that oil-immiscible fluids such as water and/or steam are effective flooding or driving fluids for use in the recovery of hydrocarbons from formations by primary, secondary or even tertiary recovery processes, such means present many problems particularly when the formation is water and/or steam sensitive as in the case of clayey formations. In such cases the water sensitive formations when in contact with water, tend to swell and disintegrate with resultant reduction in the permeability of the formation to subsequent water and/or flooding operation utilized in hydrocarbons, e.g., oil recovery processes.

Various means are employed to effect improved stability and permeability of formations to water and/or steam in order to prevent or decrease loss of flooding or driving fluid and to increase its injectivity into formations in order to improve and increase recovery of hydrocarbons from said formation. In the case of water sensitive formations such as clayey formations, the emphasis is to use various means so as to prevent or reduce swelling of the formation, such as by treating said formations with aqueous solutions containing nitrogen base compounds as described in U.S. Patents 2,761,835 and 2,761,843 or by contacting the earth formations with oil or with aqueous solutions containing a variety of water-soluble anionic, cationic or non-ionic surfactants. These methods have been found to be essentially ineffective particularly when these so-called treated formations are subjected to fresh water-flooding operations in recovery of oil.

An object of the present invention is to provide an improved process for conditioning formations for fluid flooding drive as used in hydrocarbon recovery.

Another object of the present invention is to pre-treat by a combination of acidizing and oil-wetting treatment, a formation subsequently to be subjected to fluid drive to aid in hydrocarbon recovery.

Still another object of the present invention is to treat a formation with an acidizing fluid and an oil-wetting solution so as to stabilize the formation and improve its permeability to water.

Still another object of this invention is to stabilize and improve the effective permeability of a subterranean earth formation by a combination of an acid treatment and a treatment with an oil-water emulsion capable of oil wetting the grains of the formation.

Other objects and advantages will be apparent from the description and examples illustrating the present invention.

SUMMARY OF THE INVENTION

It has now been discovered that stabilization and preferential permeability to fluid flooding such as water and/or steam flooding of subterranean earth formations can be effectively accomplished by a combination treatment, of the formations prior to fluid flooding or driving, with a pair of liquids comprising (a) an acidizing liquid and (b) an oil emulsion containing surfactants capable of oil wetting the grains of the formation. The order in which liquids (a) and (b) are used is not critical and depends upon the type and condition of the formation being treated by the combination of liquids (a) and (b). However, preferred treatment comprises first acidizing and then oil wetting the formation. The combination treatment with liquids (a) and (b) results in a synergistic effect with respect to formation stability, permeability, effectiveness of fluid injectivity and inhibiting of water and/or steam losses in the formation.

Briefly stated a process of this invention comprises, prior to water and/or steam flooding, pretreating the formation with a combination of an acidizing liquid and with an oil wetting emulsifiable oil-water containing liquid to obtain synergistic effects the entire formation treatment for hydrocarbon recovery comprising:

(1) Injecting a pair of liquids (a) and (b) or (b) and (a) as defined above through injection well or wells penetrating into an oil production area of an underground formation;

(2) Maintaining the oil emulsion in the formation for a time sufficient to oil-wet the grains of the formation contacted by the emulsion; and (3) Injecting a flooding or driving fluid, e.g., water and/or steam, through the injection well(s), under flooding conditions, to displace hydrocarbons towards a production well(s) from which oil is produced or injecting a thermal fluid such as steam into the formation, thermal soaking the formation and recovering oil thereafter by backflow through the injection well(s) or recovering the oil from a production well(s).

The acidizing liquid can be any suitable acidizing liquid capable of shrinking, agglomerating and dissolving clay particles and can include aqueous solutions containing hydrochloric and/or hydrofluoric acids or fluoride salts available commercially under the name of mud acids, typical compositions of which are as follows:

(A) water containing 10 cc. 15% HCl+3% $NH_4F$
(B)[1] water containing 10 cc. 15% HCl+3% $NH_4F$+1% HA1 45+.2% Pen 5
(C) water containing 10 cc. 10% HCl+3% $W_{35}$+1.2% A110
(D) water containing 10 cc. 15% HCl+1% HA1 45+.2% Pen 5
(E) water containing 10 cc. 15% HCl, 1% HA1 45
(F) water containing 10 cc. 15% HCl, 3% $W_{35}$, 1.2% A110

(G) 410 cc. concentrated HCl+590 cc. H$_2$O+32 grams NH$_4$F+2 cc. animal corrosion inhibitor

[1] Note Table 2 for definition of additives.

Other acidizing fluids suitable in the process of this invention include those described in U.S. patents divided into groups (I) 3,249,536; 3,251,415; 3,254,718; 3,283,816; 3,354,957; (II) 3,167,123; 3,236,305; 3,252,980; 3,252,904 and (III) 3,215,199; 3,297,090 and 3,307,630.

The oil-wetting emulsion fluids, which produce a synergistic effect in the fluid driving process of the present invention, can be suitable aqueous oil-wetting emulsions having suitable oil-wetting properties such as described in U.S. Patent 3,310,125 or copending patent application Ser. No. 601,555, filed Dec. 14, 1966, and particularly the oil-wetting emulsion described in copending patent application Ser. No. 603,722, filed Dec. 22, 1966, and which matured as U.S. Patent 3,422,890 on Jan. 21, 1969 of which the present invention is a continuation-in-part. Thus, particularly effective oil-wetting of formations before or after acidization is accomplished with an oil solution containing 0.1–10%, preferably 4–5% of a preferentially oil-soluble surface-active material that is dispersed in an aqueous solution containing 0.1–10%, preferably 0.3–0.7% of preferentially water-soluble cationic surface-active material or mixtures of water-soluble cationic and non-ionic surface-active materials and from about 0% to about 10%, preferably from about 0.5% to about 5% by weight, of an inert salt. Saline water should be used in forming emulsions of the present invention when clayey formations are encountered in order to help inhibit the earth formation clays from becoming dispersed while the emulsion is being injected into such formations. When no clay is present, e.g., where the emulsion is being injected to displace oil or change the oil wetness of a non-water-sensitive earth formation, no salt is necessary. However, since finer emulsions are generally obtained when the water contains some salt, it is preferable that the aqueous phase contain from about 0.5 to 5% salt. Where water-sensitive clays are present, the aqueous phase should preferably contain more than about 1.5% salt. Generally the oil-wetting solution containing said surfactants comprises an oil-in-saline water emulsion in which the oil or dispersed phase comprises from 1% to 40%, preferably between 3 and 10%, of the emulsion and the balance is saline water (brine) which is the continuous phase of the emulsion. Oil-wetting of formations particularly clayey formations by the present invention, preferably oil-saline water (brine) emulsion, does not only cause the formations to exhibit a significant preferential permeability to water, but where water-sensitive clays are encountered in earth formation, treatment of said formations with emulsions as described prevents or causes a significant reduction in water-swelling and disintegration tendencies of the clay. In addition, the oil-coating emulsion of the present invention changes the characteristic of the grain surfaces of the formations towards an oil-wet condition. As the oil-coating emulsion of the present invention flows into an oil-containing earth formation, it displaces oil and reduces the oil saturation of the zone into which it is injected. Both actions aid in increasing the effective permeability to water. Thus, the present process is advantageous for use in improving the water injectivity properties of both water-sensitive and non-water sensitive earth formations. Improving the preferential permeability to water may also prove to be useful for various other processes.

The components of the emulsion must be adjusted to produce a finely dispersed emulsion which may be readily injected into the formation. Thus, it is preferred that at least 70% and preferably 90% of the dispersed oil droplets not exceed dimensions of 4–5 microns and the balance be less than 10 microns and preferably the dispersed oil droplets should not be larger than 4 microns in order to prevent plugging from occurring. In general, in the preferred emulsions of the present invention, the emulsion components are mixed at a relatively high rate of shear, and the relative proportions of the components are adjusted as required so as to provide an emulsion having a filter rate that exceeds about 10 cc. per minute through a 0.45 micron millipore filter paper.

In the present process the continuous saline aqueous phase (brine phase) of the emulsion contains cationic surfactants in a unique situation. For example, where the surfactant anions are substituted ammonium ions: (1) the hydrophobic portions of the anions tend to be concentrated at the boundaries of or within the droplets of the oil solution that are dispersed within the aqueous phase of the emulsion; (2) these droplets are small enough to move within the pores of the earth formation; and (3) due to the combined effects of the preferentially oil-soluble surfactant that is dissolved in the oil and that cationic surfactant that is dissolved in the water, these droplets have an interfacial tension that is low enough to allow them to deform into an oil film. In this situation it appears that, as the ammonium ion portions of the cationic surfactant tend to move into contact with and be adsorbed on the wall surfaces of the pores of an earth formation, the oil droplets are carried along by the substituted ammonium ions and are spread into a film that covers the solid surfaces of the earth formation. In any event it is clear that the earth formation tends to become oil-wet and any water-swellable clays that are present in the earth formation tend to be prevented from becoming swelled by fresh water that is injected after the emulsion has been injected.

The use of emulsions of the present invention as pretreatment slugs in formations from which oil is to be recovered by water flooding is advantageous in many respects as with respect to economically transporting the oil solution deeply into the earth formation and ensuring the adherence of an oil film on substantially all of the grains, and the use of such emulsions has been found profitable in commercial uses of the invention.

The oil phase of the emulsion comprises up to 40% and preferably from about 1 to about 10% by weight of the emulsion and can be any suitable liquid hydrocarbon such as petroleum oils, e.g., diesel oil, aromatic solvents, aromatic hydrocarbons, e.g., benzene, xylene or toluene and mixtures thereof such as toluene-diesel oil mixes.

The oil-soluble surfactants which are dispersed in the oil phase of the emulsion can include oil-soluble surfactants capable of aiding in oil-wetting earth formations and particularly oil-soluble amino-containing compounds such as aromatic, aliphatic and/or cycloaliphatic amines, amides, imides, organic or inorganic salts and quaternary ammonium derivatives thereof. Among the amino-containing compounds are included aniline, alkyl-substituted aniline, e.g., di C$_{1-18}$ alkyl aniline, heterocyclic amino compounds, e.g., morpholine, piperidine; miscellaneous amino compounds, e.g., phenyl hydrazine, benzidine; polyalkyl polyamines, e.g., Duomeens made by Armour Chemical Company and include C$_{8-18}$ alkyl-substituted polyalkyl polyamine or alkoxy derivatives and salts thereof and other materials such as tall oil and the like. The preferentially oil-soluble surfactant can be substantially any relatively polar oil-soluble material that is capable of causing a significant reduction in the interfacial tension, of about 50 dynes per centimeter, that is characteristic of an oil-water interface.

A particularly useful oil-soluble surfactant for emulsions of the present invention is an oil-soluble salt of an N-alkyl-substituted polyamine and a fatty acid or a dimer acid and compounds of this type can be prepared by the methods described in U.S. Patents 2,736,658; 2,798,045 or 3,017,360. Salts of this type are manufactured by Armour Industrial Chemical Company under the name of Redicote 75TXO and the acid portion of the salt has the formula C$_{16-18}$NH(CH$_2$)$_3$NH$_2$—C$_{17}$H$_{33}$COOH and can include Duomeen T-mono- and dioleate or Duomeen S- mono- and dioleate, or Duomeen C-mono- and dioleate wherein the Duomeens are fully described in U.S. Patent 2,798,045. The corresponding laurates, stearates and the like can be used as substitutes or in mixtures with oleate salts and preferred is Redicote 75TXO as described. These oil-soluble polyamine salts are particularly compatible with the water-soluble cationic emulsifiers used in the aqueous phase of the emulsions.

The water-soluble cationic surfactants or mixtures of cationic and non-ionic surfactants used in the saline aqueous (brine) phase of the emulsion can be substantially any well-known surfactant of this type, examples of which are described in the Encyclopedia of Chemical Technology, The Interscience Encyclopedia, Inc., vol. 13, pages 515–517 (1954).

Especially desirable water-soluble organic cationic agents for making oil-in-water emulsions of the present invention, and which may be used in conjunction with water-soluble agents include quaternary ammonium halides described in U.S. Patents 2,775,617; 2,933,530; 2,950,318; 3,024,283; 3,073,864 and 3,175,008 and are manufactured by Armour Industrial Chemical Company under the name of Redicote E11. Redicote E11 is a chloride of quaternary ammonium compound having the formula

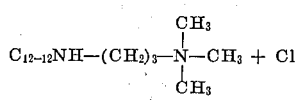

which is normally available as a solution in isopropyl alcohol (Redicote E12L) for ease of handling and dissolving it and emulsifying it in an oil mixture and water. One well-known process of preparing quaternary ammonium compounds which is in rather widespread industrial use involves the alkylation of alkyl secondary amines with alkyl halides to produce tetra-alkyl ammonium halides. In general, this process can be represented by the following equation:

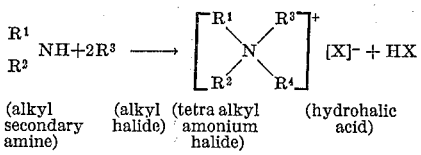

(alkyl secondary amine) (alkyl halide) (tetra alkyl amonium halide) (hydrohalic acid)

wherein $R^1$ has a carbon chain of from 8 to 20 and where the other R's are hydrogen and/or $C_{1-4}$ alkyl groups.

In conjunction with the above water-soluble cationic emulsifier may be used non-ionic agents such as are sold by Armour Industrial Chemical Company under the trade name Redicote E12. Such products are made by reacting an alkylphenol, such as octyl or nonyl phenol with from 2 to 16, preferably from 3 to 12, moles of alkylene oxide such as ethylene and/or propylene oxides, preferably the ethylene oxides, to yield a preferentially water-soluble phenoxy polyalkylene glycol having the formula:

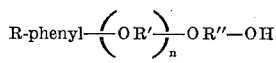

wherein $n$ is an integer of from 2 to 16, preferably from 3 to 12, R is an alkyl radical of from 4 to 20 carbon atoms, preferably 4 to 16, and R' and R'' are the same or different alkylene groups such as ethylene or propylene groups. If desired, small amounts of amines, e.g., aliphatic amines or aromatic amines (aniline), may be added as an auxiliary emulsifier. Thus, the aqueous phase of the emulsion may be added as an auxiliary emulsifier. Thus, the aqueous phase of the emulsion may also include a minor portion, say 0.5 to 3.0% of an aliphatic amine having from 1 to 12 carbon atoms and preferably from 3 to 8, such as butyl or dipropylamine, or an aromatic amine such as aniline, alkyl aniline, diphenylamine, dicresylamine or dinaphthylamine. When aniline or other aromatic amines are used in emulsions of this invention, they appear to essentially act as auxiliary oil-wetting agents.

The aqueous phase of the emulsion may if desired contain a small amount of an inert salt such as an alkali metal and/or alkaline earth metal halide, sulfate, carbonate such as sodium chloride and/or calcium chloride where clay formation is encountered so as to prevent the clay from being dispersed while the emulsion is being injected into the earth formation. When no clay is present the aqueous phase need not contain a salt. In other words the salinity of the aqueous phase of the emulsion is generally governed by the type of formation involved and if it is clayey the aqueous phase should contain an inert salt in an amount of not less than approximately 0.5% and preferably between about 0.5% and about 5%.

The following oil coating emulsions useful as pretreatment slugs in rendering formations permeable to water flooding during recovery of oil illustrate the invention. The emulsions were prepared by dissolving the oil-soluble surfactant in oil and the water-soluble additives in brine and homogenizing the two solutions for about 2–10 minutes in a homogenizer such as an Eppenbach homogenizer.

(I)

| | Percent vol. |
|---|---|
| Diesel oil | 5 |
| Redicote 75TXO | 0.22 |
| Redicote E11 | 0.4 |
| Redicote E12L | 0.05 |
| Brine | Balance |

(II)

| | |
|---|---|
| 50/50 mixture of diesel oil and toluene | 5 |
| Redicote 75TXO | 0.22 |
| Redicote E11 | 0.4 |
| Redicote E12L | 0.05 |
| Brine | Balance |

(III)

Emulsion formula—2.5% diesel oil, 2.5% toluene, .21% TXO 75, .4% $E_{11}$, .05% E12L in 0.5% brine.

(IV)

| | | |
|---|---|---|
| Diesel oil | percent vol | 5 |
| Aniline | do | 0.5 |
| Redicote 75TXO | do | 0.2 |
| Redicote E11 | do | 0.25 |
| $NaCl_2$ | percent wt | 3 |
| Brine | | Balance |

(V)

| | | |
|---|---|---|
| Diesel oil | percent vol | 5 |
| Redicote 75TXO | do | 0.4 |
| Redicote E11 | do | 0.5 |
| Redicote E12L | do | 0.05 |
| $CaCl_2$ | percent wt | 2 |
| Brine | | Balance |

(VI)

| | | |
|---|---|---|
| Diesel oil | percent vol | 1 |
| Redicote 75TXO | do | 0.08 |
| Redicote E11 | do | 0.1 |
| Redicote E12L | do | 0.1 |
| CaCl | percent wt | 2 |
| Brine | | Balance |

The superiority of the process of the present invention is illustrated by the following tests and the results are shown in Tables 1, 2 and 3.

PREFERRED EMBODIMENT OF THE INVENTION

The superiority of the process of the present invention, namely in acidizing oil-wetting formations prior to water and/or steam flooding or driving techniques in recovering hydrocarbons is illustrated by the test results described below and shown in the Tables 1–4.

Longevity of treatment

The longevity of treatment on formations by the process of this invention was determined by treating four Berea cores with emulsions (I and II) and thereafter flooded with fresh water at two different flow rates. The permeability of the whole core and of the two halves after sectioning was then determined and the results are shown in Table 1.

not effect or destroy the protective oil coating. To test this, Berea cores were treated with emulsion and then treated with acids containing various inhibitors and surfactants as noted in Table 2. In some cases there was a short brine flood between the emulsion and acid treatments. Finally, the cores were flooded for 16 hours at 170° F. with distilled water. A reduction in permeability by the distilled water was taken to indicate that the acid had reduced the efficacy of the oil coating. However, it may be seen from the values of $k_{w_{2a}}$ (brine) and $k_{w_3}$ (fresh water) shown in Table 2 that such a reduction did not take place after the cores had been treated with HCl

TABLE 1.—LONGEVITY OF EMULSION [1] TREATMENT

[Berea cores 6.5 cm. long. Single phase tests permeabilties (single phase)]

| Core No. | To brine after treatment | To fresh water at start of flood | At end of flood | | | Volume Fresh water cc. |
|---|---|---|---|---|---|---|
| | | | Whole core | 1st half | 2nd half | |
| (1) Treated | 37 | 34 | 21 | 16 | 24 | 31,000 |
| (2) Treated | 38 | 38 | 18 | 15 | 21 | 38,500 |
| (3) Treated | 41 | 40 | 27 | 23 | 32 | 16,300 |
| (4) Treated | 30 | 40 | 27 | 22 | 32 | 15,800 |
| (5) Not treated | 49 | 0.28 | | | | 10 |

[1] Emulsion formula—2.5% diesel oil, 2.5% toluene, .21% TXO 75, .4% Ell, 0.5% E12L in 0.5% brine (III).

In evaluating the results the maximum amount injected 38,500 cc., into a 1-inch OD core is equivalent to injecting some 10,000 bbl. over a 100-foot interval in a 9-inch hole. Although there was a significant drop in the permeability in all the cores after extended fresh water floods, or HCl–HF mixtures. However, there was some reduction in $k_{w_3}$ in cores treated with acid containing Dowell's sludge inhibitor, $W_{35}$, and corrosion inhibitor A111 (see experiment 7 in Table 2), but not with the other additives tested.

TABLE 2.—ACIDIZATION OF BEREA CORES AFTER INJECTING EMULSION [2]

| Expt. No. | $k_w$ md. | $k_{w_2}$ md. | Emulsion, cc. | $k_{w_2}$ md. | Acid Formula | Brine, $k_{w_{2a}}$ md. | Fresh water, $k_{w_3}$ md. |
|---|---|---|---|---|---|---|---|
| 1 | 44 | 5.3 | None | | None | | .016 |
| 2 | 37 | 2.3 | 25 | 20 | ...do... | | 16 |
| 3 | 44 | 5 | 25 | 10 | (A) 10 cc. 15% HCl+3% NH₄F | 26 | 27 |
| 4 | 40 | 3 | 25 | 11 | (B) 10 cc. 15% HCl+3% NH₄F +1% HAl 45+.2% Pen. | 23 | 23 |
| 5 | 50 | 3 | 25 | ND | (B) Same as above | 26 | 30 |
| 6 | 37 | 2.3 | 25 | ND | (D) 10 cc. 15% HCl+1% HAl 45+.2% Pen 5 | 25 | 23 |
| 7 | 38 | 7 | 25 | 10 | (C) 10 cc. 15% HCl+3% W₃₅+1.2% AllO | 29 | 14 |
| 8 | 42 | 3 | None | | (B) Same as above | 14 | 9 |

[1] Emulsion formula—2.5% diesel oil, 2.5% toluene, .21% TXO 75, .4%Ell, 0.5% E12L in 0.5% brine (III).
$k_w$=single phase permeability to brine (3% NaCl).
$k_{w_1}$=effective permeability to brine at SO.
$k_{w_2}$=same after treatment with emulsion.
$k_{w_3}$=same after treatment with emulsion and acid.
$k_{w_3}$=effective permeability to distilled water after 16 hour flood at 170° F.
All permeabilities taken at 100 p.s.i. and 75° F.
HAl 45 is a corrosion inhibitor (Halliburton).
Pen 5—Wetting agent (Halliburton)
$W_{35}$—Sludge inhibitor (Dowell).
A110—Corrosion inhibitor (Dowell).

the decreases are small compared to that which took place after only 10 cc. of fresh water was flushed through a core which had not been treated with emulsion (Core 5, Table 1). Therefore, it is considered that the emulsion treatment was still largely effective after the extended

Additional test data

A considerable number of additional comparative tests were made, typical examples of which are shown in Table 3.

TABLE 3.—TREATMENT OF BEREA CORES PRIOR TO INJECTING EMULSION [1]

| Expt. No. | $k_w$ md. | $k_{w_1}$ md. | Treatment with CS₂ with or without acid. | $k_{w_{1a}}$ md. | Emulsion cc. | $k_{w_2}$ md. | $k_{w_3}$ md. |
|---|---|---|---|---|---|---|---|
| 1 | 36 | 2.6 | (B) 10 cc 15% HCl, 3% NH₄F, 1% HAl 45, .2% Pen. | 16 | 25 | 26 | 27 |
| 2 | 32 | 2.4 | (E) 10 cc. 15% HCl, 1% HAl 45 | ND | 25 | 22 | 20 |
| 3 | 35 | 4.9 | (C) 10 cc. 15% HCl, .5% W₃₅, .6% AllO | ND | 25 | 13 | 20 |
| 4 | 36 | 3.5 | (F) 10 cc. 15% HCl, 3% W₃₅, 1.2% AllO | ND | 25 | 19 | 17 |
| 5 | 43 | 5 | None | | 25 | 18 | 8 |
| 6 | 42 | 5 | 10 cc. 15% HCl, 1% HAl 45 | 17 | None | | 7 |

[1] Note Table 2.
$k_{w_{1a}}$—Permeability to 3% NaCl after acid or other pretreatment. Other symbols as in Table 2.
All permeabilities taken at 100 p.s.i. and 75° F.

fresh water floods. The difference in permeability between the front and back of the cores suggests that the permeability decrease may have been caused by traces of contaminants which may have persisted in the water despite filtering and biocide treatments.

Effect of acid on oil coating

Injection wells were periodically treated with (mud acid) to clean up impairment caused by trace impurities in the injection water, scale, etc. Such treatments did

Acid pretreatments

In all cases in which the cores were pretreated with acids comprising HCl-HF mixtures, $k_{w_2}$ and $k_{w_3}$ were higher than when treated with emulsion only (of experiment 1 with experiment 5). Good results were also obtained when the NH₄F was omitted (of experiments 1 and 2). Furthermore, it is clear that treating with both acid and emulsion gave better results than treating with either separately (of experiments 2, 5, and 6).

Effect of sludge additives

Considerable evidence was obtained that Dowell's $W_{35}$ sludge inhibitor may cause loss of permeability when used in acidization prior to emulsion treatment. The effect is not too marked in experiments 4 and 5, in which only a small reduction in $k_{w_2}$ was observed. However, when a brine flush is used between the acid and emulsion treatment, values of 6 md. were obtained for $k_{w_2}$ and $k_{w_3}$.

Tests were also made on single-phase systems containing no residual oil. Results are shown in Table 4.

TABLE 4.—TREATMENT OF SINGLE PHASE CORES PRIOR TO INJECTING OC EMULSION

| Expt. No. | $k_1$ (brine) md. | Acid treatment | Emulsion cc. | $k_2$ (brine) md. | $k_3$ (dist. water) md. |
|---|---|---|---|---|---|
| 1 | 39 | 10 cc. 15% HCl | 25 | 53 | 52 |
| 2 | 45 | 10 cc. 15% HCl+1% HAl 45 .2% Pen 5. | 25 | 65 | 65 |
| 3 | 48 | 10 cc. 15% HCl+3% $W_{35}$, .6% A110. | 25 | 33 | 32 |
| 4 | 48 | 10 cc. 15% HCl+3% $W_{35}$ 1.2% A110. | 25 | 17 | 3 |
| 5 | 43 | 10 cc. 15% HCl+1.2% A110 | 25 | 38 | 44 |
| 6 | 51 | 10 cc. 15% HCl+1.5% $AS_5$, 3% Morflo, 1% HAl 45. | 25 | 62 | 11 |
| 7 | 43 | 10 cc. 15% HCl+1.5% $Q_1$+ 1% $C_{12}$. | 25 | 49 | 44 |
| 8 | 30 | 10 cc. 15% HCl+1.5% $Q_3$+ 1% $C_{12}$. | 25 | 42 | 56 |
| 9 | 33 | 10 cc. 15% HCl+1% $C_{12}$ | 25 | 49 | 54 |
| 10 | 30 | 10 cc. 15% HCl+1.2% A109 | 25 | 55 | 57 |

$AS_5$—Anti-sludge additive (Halliburton).
Morflo—Surfactant recommended for use with $AS_5$.
$Q_1$—Anti-sludge additive (BJ)
$Q_3$—Anti-sludge additive (BJ).
$C_{12}$—High temperature corrosion inhibitor (BJ).
A109—Low temperature corrosion inhibitor (Dowell).

Comparing experiments 3 and 4 with 1 and 2, it may be seen that $W_{35}$ markedly reduces $K_2$ and $K_3$. Furthermore, at the higher concentration of $W_{35}$ used in experiment 4, $k_3$ was less than $k_2$, indicating interference with the coating properties of the emulsion. Table 4 also shows that some inhibitors such as Halliburton's sludge inhibitor $AS_5$ has an adverse effect similar to that of $W_{35}$ but BJ's $Q_1$ and $Q_3$ appear to be harmless. However, the $Q_3$ broke out of the acid so fast that only a portion was injected into the core and therefore the favorable result must be treated with reserve. It can be noted that various corrosion additives did not seriously interfere with the emulsion treatment.

Any loss of permeability which might be caused by the brine flush could be restored by treating again with an acid containing no sludge inhibitor immediately before the emulsion treatment. The following recommendations should be followed in field tests and work based on the laboratory test results.

(1) If emulsion treatments are to be made or have been made on a well, sludge inhibitors should be used when they are essential, i.e., in the initial clean-up acidization after completion of an injector.

(2) Use the minimum inhibitor required to prevent sludge formation.

(3) If water is produced or injected into the well after the primary acid job, acidize a second time without sludge inhibitor immediately prior to treating with an emulsion.

Emulsion concentrates

To facilitate handling and preparation of the emulsion it is preferable that it be prepared as a concentrate and injected into the injection water at the well head. If the oil phase of the concentrate is not greater than 50 percent of the total volume of the emulsion, it has been found that the droplet size of the emulsion is about the same as if the emulsion were prepared in dilute form and thus no mechanical agitation is needed when the concentrate is diluted.

From the test results shown in Tables 1–4 it can be clearly seen that synergism is effected by the acid-oil-wetting pretreatment of formations prior to water and/or steam flooding.

I claim as my invention:

1. A process for treating oil wells and recovering oil from an underground formation comprising:
   (a) penetrating an oil production zone of an underground formation with at least one pair of injection and production wells in communication with each other;
   (b) injecting into the injection well two liquids, one being an acidizing liquid;
   (c) injecting an oil-wetting emulsion capable of oil-wetting grains of the formation containing an oil-soluble amino-nitrogen containing surfactant in the oil phase and at least one water-soluble surfactant in the water phase and the driving fluid is water;
   (d) injecting a fluid drive composition through the injection well and;
   (e) driving the oil toward the production well and recovering oil therefrom.

2. The process of claim 1 wherein the acidizing liquid is a mud acid, the emulsion is an oil-in-water emulsion containing an oil-soluble cationic surfactant in the oil phase and at least one water-soluble surfactant in the water phase and the driving fluid is water.

3. A process of claim 2 wherein the water phase of the emulsion contains from 0.5% to 5% of an inert salt and the dispersed oil droplet size is generally less than 4 microns, the acid is a mud acid containing at least 15% HCl and the injected acid, emulsion and water flooding is introduced into the formation through an injection well and the hydrocarbons are recovered from said formation through a production well.

4. A process of claim 2 wherein the water used in forming the oil-in-water emulsion is brine containing at least 1.5% of an inorganic salt; the oil droplet size is less than 4 microns; the oil-soluble cationic surfactant is a polyamine salt of a fatty acid and the water-soluble surfactant is a water-soluble quaternary ammonium compound and the acidizing liquid is an aqueous hydrochloric acid solution.

5. A process of claim 2 wherein the water used in forming the oil-in-water emulsion is brine containing at least 1.5% of an inorganic salt; the oil droplet size is less than 4 microns; the oil-soluble cationic surfactant is a polyamine salt of a fatty acid and the water-soluble surfactant is a water-soluble quaternary ammonium compound and the acidizing liquid is an aqueous solution of HCl and $NH_4F$.

6. A process of claim 5 wherein the quaternary compound is in an alcoholic solvent.

7. A process of claim 5 wherein the emulsion contains a small amount of a non-ionic agent.

8. A process of claim 7 wherein the non-ionic agent is an alkyl phenol-alkylene oxide reaction product.

9. The process of claim 1 wherein the formation being treated and from which oil is recovered is a water-sensitive formation and improved with respect to stability and permeability to water by treatment by the process of claim 1.

10. A process of claim 1 wherein the water-soluble cationic surfactant is selected from the group consisting of a water-soluble cationic surfactant and a mixture of a water-soluble surfactant and a nonionic surfactant.

11. An improved process for treating an oil well penetrating an oil producing underground formation for subsequent oil recovery comprising:
(a) injecting into the well an acidizing liquid, and;
(b) injecting an oil-wetting oil-water emulsion capable of oil-wetting grains of the formation around the oil well area containing an oil-soluble amino-nitrogen containing surfactant in the oil phase of the emulsion and at least one water-soluble cationic surfactant in the water phase of the emulsion.

12. The process of claim 11 wherein the acidizing liquid is a mud acid and the emulsion consists of an oil-in-water emulsion containing an oil-soluble amino-nitrogen containing salt in the oil phase and in the water phase a water-soluble surfactant selected from the group consisting of a water-soluble cationic surfactant and a mixture of a water-soluble cationic surfactant and a nonionic surfactant.

13. The process of claim 12 wherein the amino-nitrogen containing salt is a polyamine salt of a fatty acid, the water-soluble cationic surfactant is a quatenary ammonium chloride and the nonionic surfactant is an alkyl phenol-ethylene oxide reaction product.

14. The process of claim 11 wherein the acidizing liquid is an aqueous solution of HCl and $NH_4F$ and the emulsion consists of an oil-in-water emulsion containing an oil-soluble amino-nitrogen containing salt in the oil phase and in the water phase a water-soluble surfactant selected from the group consisting of a water-soluble cationic surfactant and a nonionic surfactant.

References Cited

UNITED STATES PATENTS

| | | | |
|---|---|---|---|
| 2,689,009 | 9/1954 | Brainerd et al. | 166—42 |
| 2,802,531 | 8/1957 | Cardwell et al. | 166—42 |
| 2,852,077 | 9/1958 | Cocks | 166—9 |
| 3,208,517 | 9/1965 | Binder et al. | 166—9 |
| 3,288,213 | 11/1966 | King et al. | 66—9 |
| 3,343,602 | 9/1967 | Knox et al. | 166—42 |
| 3,353,593 | 11/1967 | Boberg | 166—11 X |

STEPHEN J. NOVOSAD, Primary Examiner

U.S. Cl. X.R.

166—272, 273, 275, 263